Patented May 26, 1925.

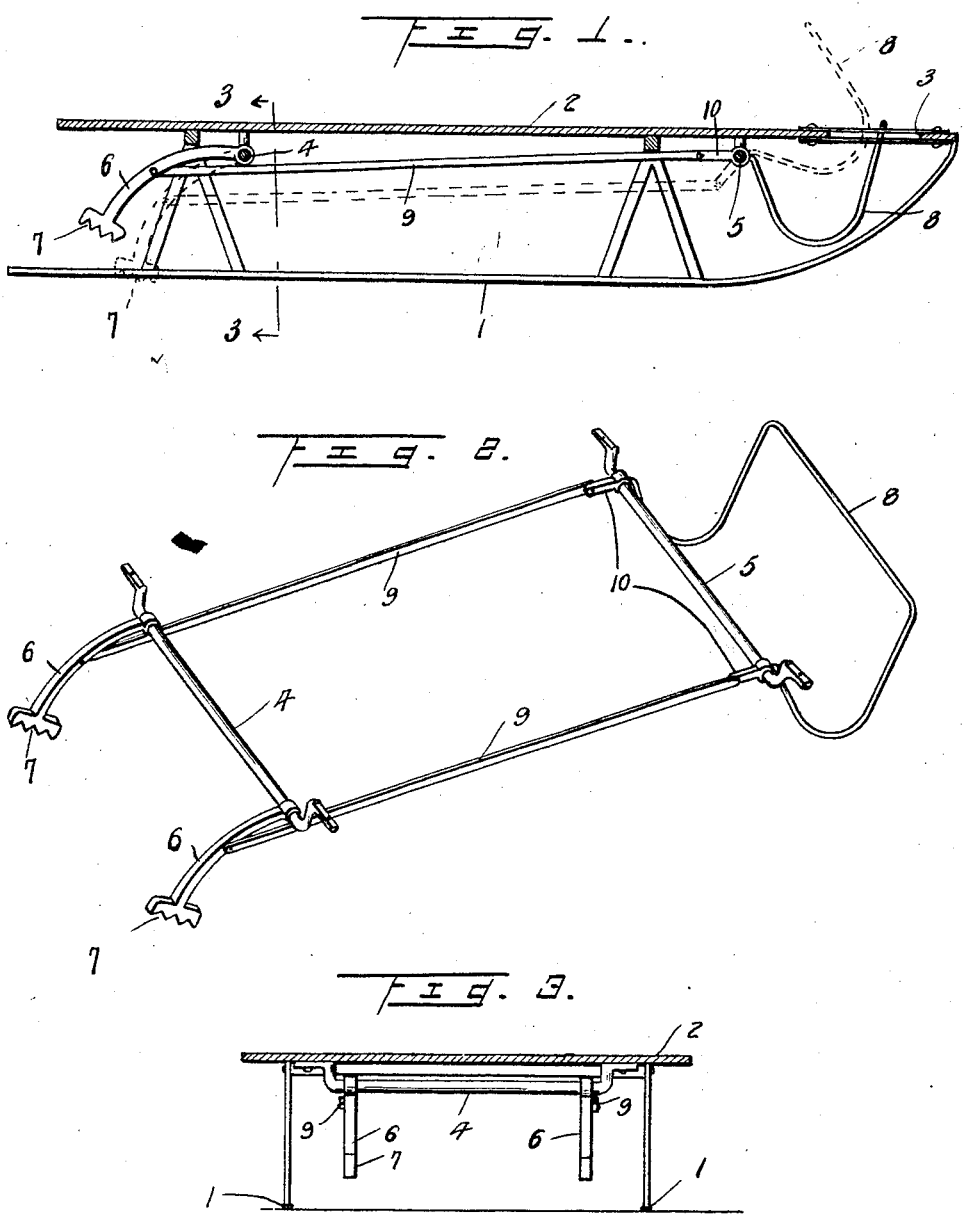

UNITED STATES PATENT OFFICE.

HERMAN G. MEYER, OF NEW YORK, N. Y.

SLED BRAKE.

Application filed December 28, 1922. Serial No. 609,418.

*To all whom it may concern:*

Be it known that I, HERMAN G. MEYER, a citizen of the United States, residing at New York city, in the county of New York and State of New York, have invented certain new and useful Improvements in Sled Brakes; and I do hereby declare the following to be a full, clear, and exact description of the invention, such as will enable others skilled in the art to which it appertains to make and use the same.

The invention has relation to sleds, and more particularly to controlling means therefor, whereby the sled, when coasting, may be brought to a standstill or have its speed regulated so as to obviate accidents.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application.

Figure 1 is a vertical, central, longitudinal section of a sled illustrative of the invention, the full lines showing the normal position of the brake mechanism and the dotted lines illustrating the position of the parts when the brake is applied.

Figure 2 is a detail perspective view of the brake mechanism, and

Figure 3 is a transverse section on the line 3—3 of Figure 1, looking to the rear as indicated by the arrows.

Corresponding and like parts are referred to in the following description and designated in the several views of the drawings by like reference characters.

The sled shown may be of any construction and is illustrated to demonstrate the application of the invention and comprises runners 1, a top 2 and a crosspiece 3, the latter constituting a foot rest and hand bar.

In accordance with the present invention, transverse bracket members 4 and 5 are disposed beneath the top of the sled adjacent the ends thereof, each consisting of a rod having opposite ends offset and apertured to receive suitable fastenings whereby the members are attached to opposite side portions of the sled. Curved arms 6 are pivotally mounted at one end on the member 4 and each is provided at its free end with a shoe 7 which is preferably corrugated or toothed so as to make positive engagement with the surface of ice or snow, whereby to bite therein and provide for controlling the speed of the sled. An operating member 8 of substantially U-form in plan is pivotally mounted upon the member 5 and normally occupies an approximately horizontal position whereby gravity serves to hold the brake out of action and the shoes 7 elevated, as indicated by the full lines in Figure 1. Links or rods 9 pivotally connect the lower rear ends or cranks 10 of the side members of the operating member 8 with the arms 6, such parts being so disposed that the rods 9 and cranks 10 are in the same horizontal line, when the operating member is depressed, in order to hold or lock the shoes 7 elevated so as to prevent the brake arms 6 being accidentally depressed or applied. Upon actuating the member 8 to elevate the cross bar thereof and lower the rear ends of the side members, the arms 6 are operated to lower the shoes 7 and bring them in contact with the surface of the ice or snow, as indicated by the dotted lines in Figure 1, whereby the speed of the sled when coasting may be regulated or the sled may be brought to a standstill as required to avoid an accident.

What is claimed is:

A sled having braking arms pivoted adjacent the rear thereof, a bracket adjacent the front of the sled, a substantially U-shaped operating member having its bridge disposed foremost and transversely of the sled adjacent the front thereof and adapted to engage the sled proper upon depression, the side portions of the operating member being pivoted on the bracket and having cranks extending rearwardly thereof, and connecting means between said cranks and said braking members, said connecting means and said cranks being adapted to occupy the same straight line when the operating member is in depressed position.

In testimony whereof I affix my signature in presence of two witnesses.

HERMAN G. MEYER.

Witnesses:
BERNHARD LOREK,
E. B. NIETZEL.